H. C. TROY.
MILK TESTING BOTTLE.
APPLICATION FILED APR. 6, 1910.
988,155.
Patented Mar. 28, 1911.
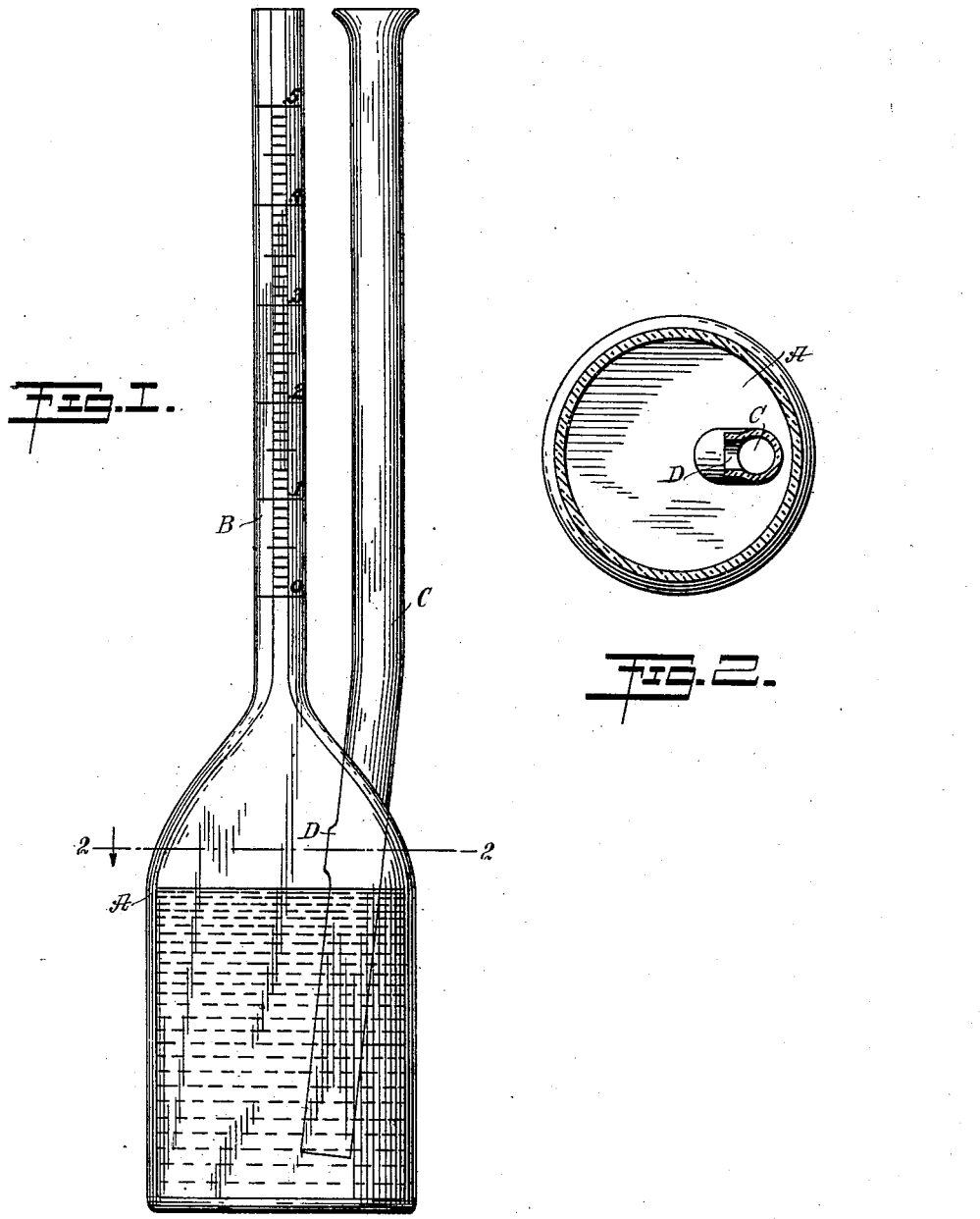
WITNESSES:
INVENTOR
Hugh C. Troy
BY
ATTORNEYS

UNITED STATES PATENT OFFICE.

HUGH C. TROY, OF ITHACA, NEW YORK.

MILK-TESTING BOTTLE.

988,155.   Specification of Letters Patent.   Patented Mar. 28, 1911.

Application filed April 6, 1910. Serial No. 553,713.

*To all whom it may concern:*

Be it known that I, HUGH C. TROY, a citizen of the United States, and a resident of Ithaca, in the county of Tompkins and State of New York, have invented a new and Improved Milk-Testing Bottle, of which the following is a full, clear, and exact description.

The invention relates to milk testing bottles, such as shown and described in the Letters Patent of the United States, No. 794,572, granted to Constantin Wagner, on July 11, 1905.

The object of the invention is to provide a new and improved milk testing bottle, arranged to allow free escape of the heated air incident to the mixing of the milk with the testing acid, thus preventing rising of the coagulated milk during the mixing operation, arranged to wash the fat free from sediment, by permitting the addition of water after the first whirling action of the centrifuge, and arranged to prevent distribution of the sediment in the bottom of the bottle to prevent clogging up of the graduated neck on emptying the bottle, and to permit the quick emptying of the bottle.

For the purpose mentioned, the body of the milk testing bottle is provided with the usual graduated neck and with means for introducing liquids into the body near the bottom and upper portion of the body, the means also forming a vent for the escape of air from the upper portion of the body.

A practical embodiment of the invention is represented in the accompanying drawings forming a part of this specification, in which similar characters of reference indicate corresponding parts in both views.

Figure 1 is an enlarged side elevation of the milk testing bottle; and Fig. 2 is a sectional plan view of the same, on the line 2—2 of Fig. 1.

The body A of the glass bottle is provided with the usual graduated neck B, having a capillary bore, and into the body A extends the lower portion of a tube C having a wide bore, and reaching with its upper end approximately to the upper end of the graduated neck B. As shown in Fig. 1, the tube C extends through the wall of the body A at one side of the upper portion thereof, and the lower open end of the tube C is within a short distance of the bottom of the body A. An opening D is formed in the wall of the tube C within the body A and at a point a short distance above the level of the mixture of skim milk and the testing acid employed, and which mixture is filled into the vessel A through the tube C, the upper end of which is preferably funnel-shaped to allow convenient introduction of the mixture. Now by having the opening D arranged in the tube C in the manner described, the coagulated milk is not liable to rise in the graduated neck B of the bottle during the mixing process, as the heated air within the upper portion of the body A is free to escape through the opening D, which thus serves as a vent for the air.

After the first whirling action in the centrifuge, the fat is washed free from sediment by water introduced through the tube C and passing through the opening D into the upper end of the body A, and hence the water used for the purpose does not need to pass down through the lower end of the tube C, to rise within the mixture of the milk and acid contained in the body A, and it will also be noticed that any sediment that settles in the bottom of the body A is not disturbed by the introduction of the water used for washing the fat free from sediment as above mentioned.

When emptying the bottle, the liquid contained therein readily flows into the tube C by way of both the lower opening of the tube and the opening D, and hence the sediment is not liable to pass up into the capillary bore of the neck B to clog the same, and by providing the tube C with two openings within the body A, a quick emptying of the bottle can be had.

Having thus described my invention, I claim as new and desire to secure by Letters Patent:

1. A milk testing bottle, comprising a body having a graduated neck, and a tube extending into the said body, an opening near the bottom of the bottle said tube having an opening within the upper portion of the body.

2. A milk testing bottle, comprising a body having a graduated neck provided with a capillary bore, and a tube having a wide bore and extending through the wall of the said body, the said tube terminating with its lower open end within a short distance of the bottom of the body, and the said tube having a supplementary opening within the upper portion of the said body for the introduction of water into the body after the latter is filled with a mixture of milk and testing acid, and for the escape of air within the upper portion of the body above the level of the mixture.

3. A milk testing bottle, comprising a body having a graduated neck, and a tube of greater capacity than the neck extending into the bottle at one side of the neck and opening near the bottom of the body, said tube having a lateral opening near the junction of the neck with the body, for the purpose specified.

In testimony whereof I have signed my name to this specification in the presence of two subscribing witnesses.

HUGH C. TROY.

Witnesses:
P. F. McALLISTER,
E. J. BLACK.

Copies of this patent may be obtained for five cents each, by addressing the "Commissioner of Patents, Washington, D. C."